United States Patent
Vodanovic (10) Patent No.: US 7,012,631 B2
(45) Date of Patent: Mar. 14, 2006

(54) ABSOLUTE POSITION DETERMINATION FOR A CCD-BASED ACQUISITION UNIT

(75) Inventor: Bojko Vodanovic, 2 Caron Point, Baie d'Urfé, Québec (CA) H9X 2Z4

(73) Assignee: Bojko Vodanovic, Baie d'Urfe (CA)

( * ) Notice: Subject to any disclaimer, the term of this patent is extended or adjusted under 35 U.S.C. 154(b) by 743 days.

(21) Appl. No.: 10/244,608

(22) Filed: Sep. 17, 2002

(65) Prior Publication Data

US 2004/0051810 A1   Mar. 18, 2004

(51) Int. Cl.
*H04N 7/18* (2006.01)

(52) U.S. Cl. .............. 348/134; 348/67; 348/320; 348/322; 348/324

(58) Field of Classification Search ............. 348/26, 348/67, 134, 320, 322, 324; 250/559.07, 250/559.08, 559.11, 559.22, 559.38; 356/237.6, 356/604

See application file for complete search history.

(56) References Cited

U.S. PATENT DOCUMENTS

| 4,259,017 | A |   | 3/1981  | Ross et al. |
|-----------|---|---|---------|-------------|
| 4,657,394 | A | * | 4/1987  | Halioua ............... 356/604 |
| 5,048,965 | A | * | 9/1991  | Amir ................... 356/604 |
| 5,175,601 | A | * | 12/1992 | Fitts ................... 356/604 |
| 5,216,259 | A |   | 6/1993  | Stern et al. |
| 5,406,372 | A | * | 4/1995  | Vodanovic et al. ...... 356/394 |
| 5,852,672 | A | * | 12/1998 | Lu ...................... 382/154 |
| 6,335,757 | B1|   | 1/2002  | Vodanovich |
| 6,577,405 | B1| * | 6/2003  | Kranz et al. ........... 356/601 |
| 6,639,685 | B1| * | 10/2003 | Gu et al. .............. 356/603 |
| 2003/0007159 | A1 | * | 1/2003 | Franke et al. ........ 356/604 |

* cited by examiner

Primary Examiner—Vu Le
(74) Attorney, Agent, or Firm—Ogilvy Renault (57) ABSTRACT

For computing the absolute height, in a field of view of a CCD-based acquisition system, of the profile of an object moving on an assembly line, two CCD-based image acquisition devices are used. The consecutive acquired images of the two CCD-based image acquisition devices are shifted by a predefined number of lines. Using two relative heights, the absolute height of a feature located in the acquired images is computed.

20 Claims, 9 Drawing Sheets

LOOKUP DATABASE FOR (14,15) COMBINATION

| POSITION OF IMAGE 1 | POSITION OF IMAGE 2 | ABSOLUTE POSITION |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 | 13 | 13 |
| 0 | 14 | 14 |
| 1 | 0 | 15 |
| 2 | 1 | 16 |
| 3 | 2 | 17 |
| 4 | 3 | 18 |
| 5 | 4 | 19 |
| 6 | 5 | 20 |
| 7 | 6 | 21 |
| 8 | 7 | 22 |
| 9 | 8 | 23 |
| 10 | 9 | 24 |
| 11 | 10 | 25 |
| 12 | 11 | 26 |
| 13 | 12 | 27 |
| 0 | 13 | 28 |
| 1 | 14 | 29 |

ABSOLUTE POSITION DETERMINATION FOR A CCD-BASED ACQUISITION UNIT

TECHNICAL FIELD

This invention relates to the field of 2D image sensors and more particularly to CCD cameras for surface geometry inspecting. Such imaging is known as profile imaging or profilometry.

BACKGROUND OF THE INVENTION

In a conventional method for surface geometry inspection, known as profilometry, a light plane is projected on the object surface to be inspected. A camera, typically a charge-coupled device (CCD) based camera, is then used to capture the reflection of the light plane on the object. Each profile line is used by an automated system to obtain shape information about the object surface. As the light plane moves relative to the object, a series of profile lines will provide sufficient information to build a 3D model of at least a portion of the object, if desired. The profile line data is used typically for industrial quality control testing, which may involve comparing the 3D model to an expected model.

The CCD acquisition speed limits the maximum permitted speed of movement of the objects to inspect. In fact, an object may move on an assembly line at a speed that will prevent a data acquisition by the CCD, as the acquisition time is significant.

U.S. Pat. No. 6,335,757 describes a method and apparatus for acquiring images at a higher speed than the regular acquisition speed of the CCD, the specification of which is hereby incorporated by reference. This method triggers the CCD to take an image of the substantially horizontally disposed profile line within an essentially dark background at a fast rate such that a multiple j of profile lines can be acquired for each frame consisting of the number k of horizontal lines of the CCD camera. The normal appearance of the frame image data collected from such a system is a series of profile lines separated normally by a number of lines (k/j). The profile lines provide the shape of the object at each acquisition time, and typically the object is moved over time along a path such that the series of profile lines can allow the surface of the object to be reconstructed using the profile lines. By using high-speed profile line acquisition, an object can be accurately scanned while being moved more quickly. In cases where the profiles lines appear continuous and do not change in height at any horizontal point from one acquisition to the next by more than (k/j) lines, the exact profile line can be extracted with all of the height information unambiguously provided.

This prior art method may make it difficult, however, to know the height of the object profile within the field of view. When the profile line changes abruptly from one acquisition to the next, i.e. by an amount more than (k/j) lines, then two profile lines will intersect, and it is very difficult to know what the true position data of the profile line is. For example, an object whose shape changes quickly from having a bump to a depression can result in sequential profile lines overlapping at certain portions. While this problem can be avoided by defining a window height of (k/j) lines and by ensuring that profile lines resulting from scanned objects do not surpass the window height, this will typically require using a smaller value for j, and thus a slower profile line acquisition rate. Alternatively, the projected profile line image can be scaled to be smaller on the CCD surface to avoid overlap with a lower spatial resolution resulting. Reconstruction without assuming that the profile lines fit within predetermined window heights or assuming certain object properties is difficult if not impossible.

There is therefore a need for a method and apparatus that will overcome the above-mentioned drawbacks.

SUMMARY OF THE INVENTION

It is an object of the invention to provide a method and apparatus for profile inspection which enable the acquiring of an image at a speed higher than the acquisition speed of a CCD.

It is another object of the invention to provide a method and apparatus which enable the acquiring of an image at a speed higher than the acquisition speed of a CCD with the providing of the absolute height in a field of view of the acquisition apparatus.

Yet another object of the invention is to provide an apparatus with conventional CCDs in order to achieve a high speed acquisition with a good temporal and spatial resolution.

According to a first aspect of the invention, there is provided a method for imaging a profile line projected on an object, the method comprising the steps of providing at least two image acquisition devices each able to capture images of the profile line, at least one of the image acquisition devices comprising a charge-coupled device (CCD) sensor having N lines and capturing images of the profile line against an essentially dark background with a plurality of neighboring profile line images captured within the N lines, acquiring a series of images of the profile line using each of the image acquisition devices, wherein the series of images have different spatial characteristics from one another, and the neighboring profile line images overlap in a CCD sensor shift dimension; and comparing profile line image data from the at least two image acquisition devices to disambiguate the neighboring profile line images and output individual profile line data from at least the neighboring profile line images.

According to another aspect of the invention, there is provided a high speed profiling apparatus for determining the absolute height of a feature in an object being scanned, the apparatus comprising at least two image acquisition devices each able to capture images of the profile line, at least one of the image acquisition devices comprising a charge-coupled device (CCD) sensor having N lines and capturing images of the profile line against an essentially dark background with a plurality of neighboring profile line images captured within the N lines, wherein the series of images of the profile line have different spatial characteristics from one another, and the neighboring profile line images overlap in a CCD sensor shift dimension; and means for comparing profile line image data from the at least two image acquisition devices to disambiguate the neighboring profile line images and to output individual profile line data from at least the neighboring profile line images.

In the preferred embodiment, two CCD cameras are arranged to acquire an essentially identical image of the profile line while each camera is controlled to operating at two different shift values between the profile line images. This yields the disambiguation information while maintaining full resolution of the profile lines with each camera, and is preferred for this reason. Alternatively, the profile line can be imaged by two cameras with a different magnification, as for example by arranging the cameras at different angles with respect to the plane of projected light. The disambiguation information then comes from the different magnifications, for example by having one magnification that results in no profile line image overlap.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
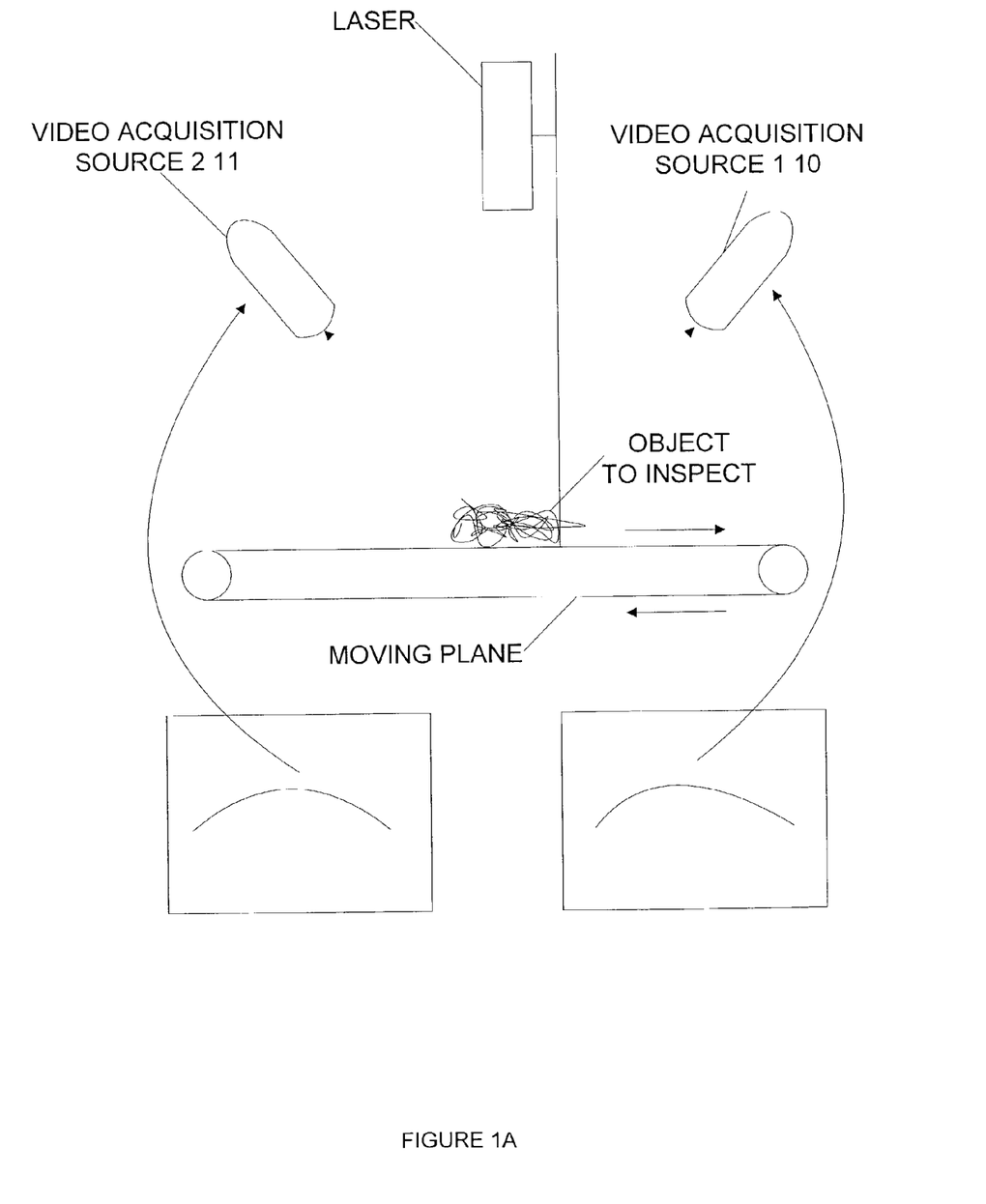
FIG. 1A shows a profile inspection apparatus comprising two video acquisition sources and a laser.

Now referring to FIG. 1A, there is shown a profile inspection apparatus according to the preferred embodiment of the invention.

The inspection apparatus comprises a first video acquisition source 10 and a second video acquisition source 11. The inspection apparatus further comprises a laser which provides a laser plane on an object to inspect.

The profile of the object to inspect will be analyzed using the reflection of the light plane on the object to inspect. The two video acquisition sources 10 and 11 are used for that purpose. In the preferred embodiment of the invention the two video acquisition sources 10 and 11 are CCD image sensors-based cameras.

According to another embodiment of the invention, a beam splitter may be used to provide the reflection of the light plane to two video acquisition sources.

Figure 2:
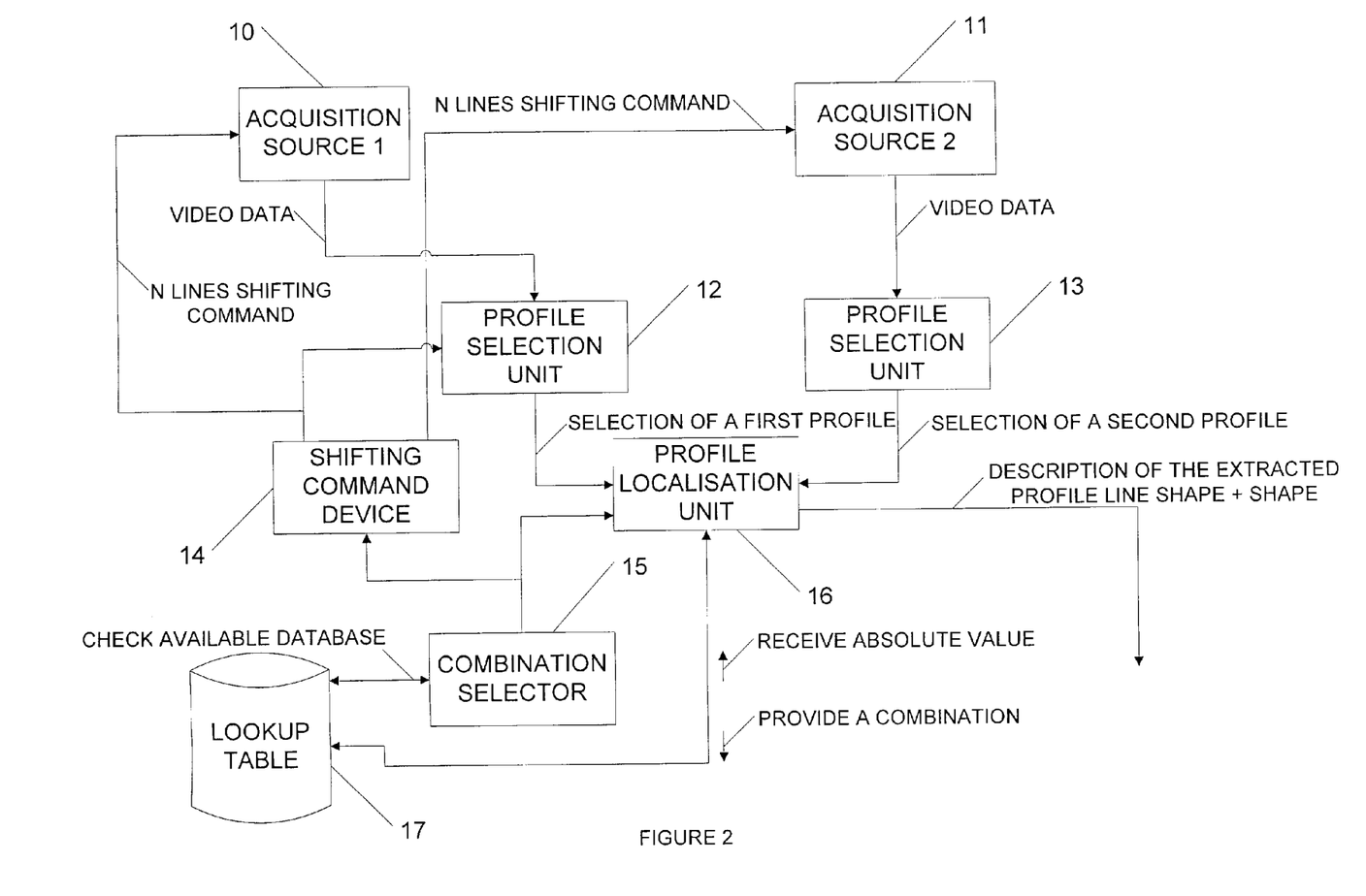
FIG. 2 is a block diagram which shows the functional elements of the preferred embodiment of the invention; the apparatus comprises two video acquisition sources, a combination selector, a lookup table, a shifting command device, two profile selection units and an image localization unit.

Now referring to FIG. 2, there is shown the components of the profile inspection apparatus. The profile inspection apparatus comprises the first video acquisition source 10 and the second video acquisition source 11. In the preferred embodiment of the invention, the two video acquisitions sources are CCD image sensors-based cameras.

The profile inspection apparatus further comprises a first profile selection unit 12 and a second profile selection unit 13. The profile inspection apparatus still further comprises a shifting command device 14, a combination selector 15, an image localization unit 16 and a lookup table 17.

The combination selector 15 may select a combination of two integers n and m in the lookup table 17. In the preferred embodiment of the invention, the greatest common denominator (GCD) of two integers n and m is one.

Each of the two selected integers relates to a number of lines to be shifted for the first video acquisition source 10 and for the second video acquisition source 11.

The combination selector 15 provides the combination of two integers n and m to the shifting command device 14. The shifting command device 14 provides a first shifting command of n lines to the first video acquisition source 10 and a second shifting command of m lines to the second video acquisition source 11.

The first video acquisition source 10 provides a video data signal to the profile selection unit 12. The second video acquisition source 11 provides a video data signal to the profile selection unit 13.

The first profile selection unit 12 and the second profile selection unit 13 select a first profile in the provided video data signal of the video acquisition source 10 and a second profile in the provided video data signal of the second video acquisition source 11 as explained below.

The image localization unit 16 collects the first profile selected by the first profile selection unit 12 and the second profile selected by the second profile selection unit 13.

The image localization unit 16 outputs a description of the selected profiles using the lookup table 17 with the combination n,m provided by the combination selector 15. As explained below, a combination n,m will provide a unique absolute height in the preferred embodiment of the invention.

Figure 3:
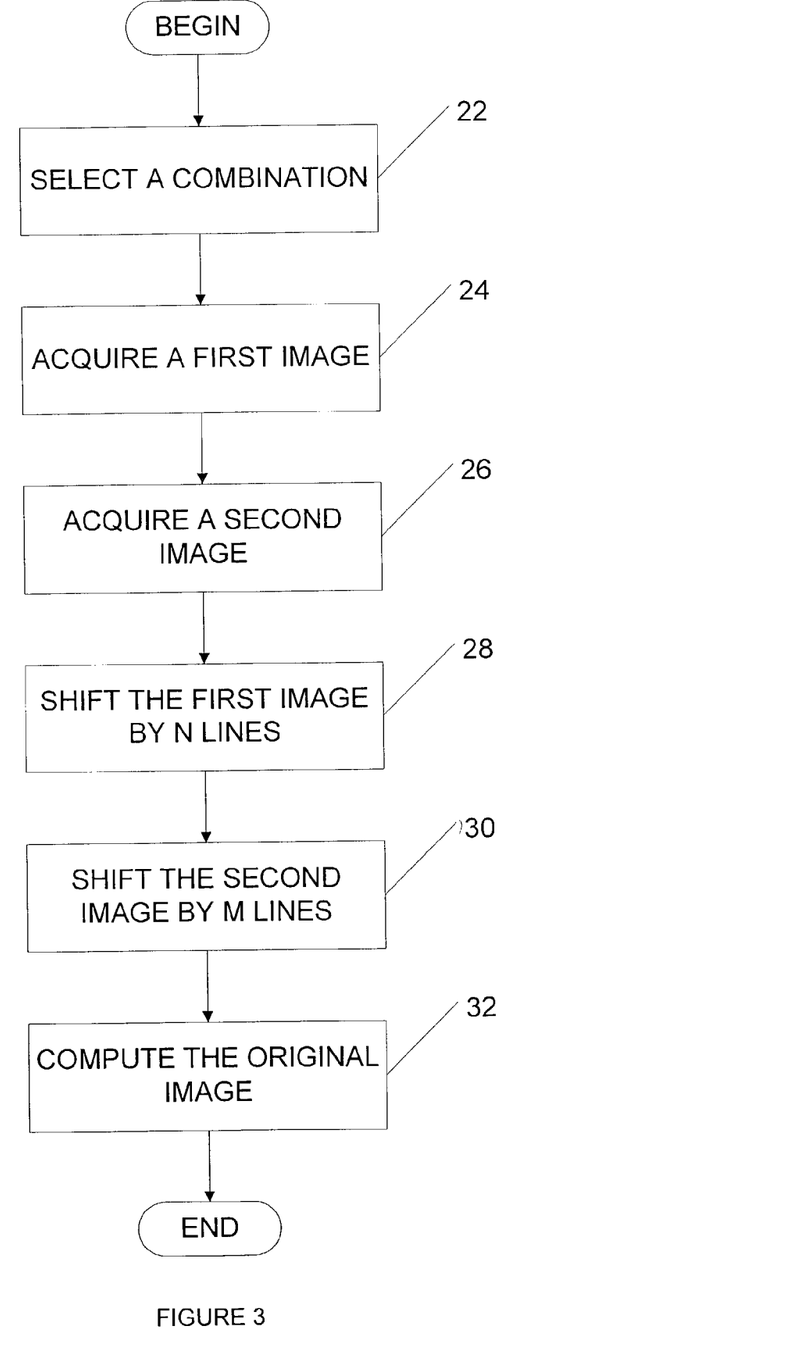
FIG. 3 is a flow chart which shows the different steps involved in the preferred embodiment of the invention.

Now referring to FIG. 3, there is shown a flow chart which provides the steps to be performed in the preferred embodiment of the invention.

According to step 22 of FIG. 3, a combination of integers n,m is selected. The combination of integers is selected in the lookup table 17 by the combination selector 15.

Still referring to FIG. 3 and according to step 24, a first image is acquired by the first video acquisition source 10.

According to step 26, a second image is acquired by the second video acquisition source 11.

Still referring to FIG. 3 and according to step 28, the first acquired image is shifted by n lines. The first acquired image is shifted using the shifting command device 14 in combination with the n integer provided by the combination selector 15.

According to step 30, the second acquired image is shifted by m lines. The second acquired image is shifted using the shifting command device 14 in combination with the m integer provided by the combination selector 15.

Still referring to FIG. 3 and according to step 32, an original image is computed using the first and the second shifted image in combination with the lookup database together with the integer combination n,m.

Figure 4:
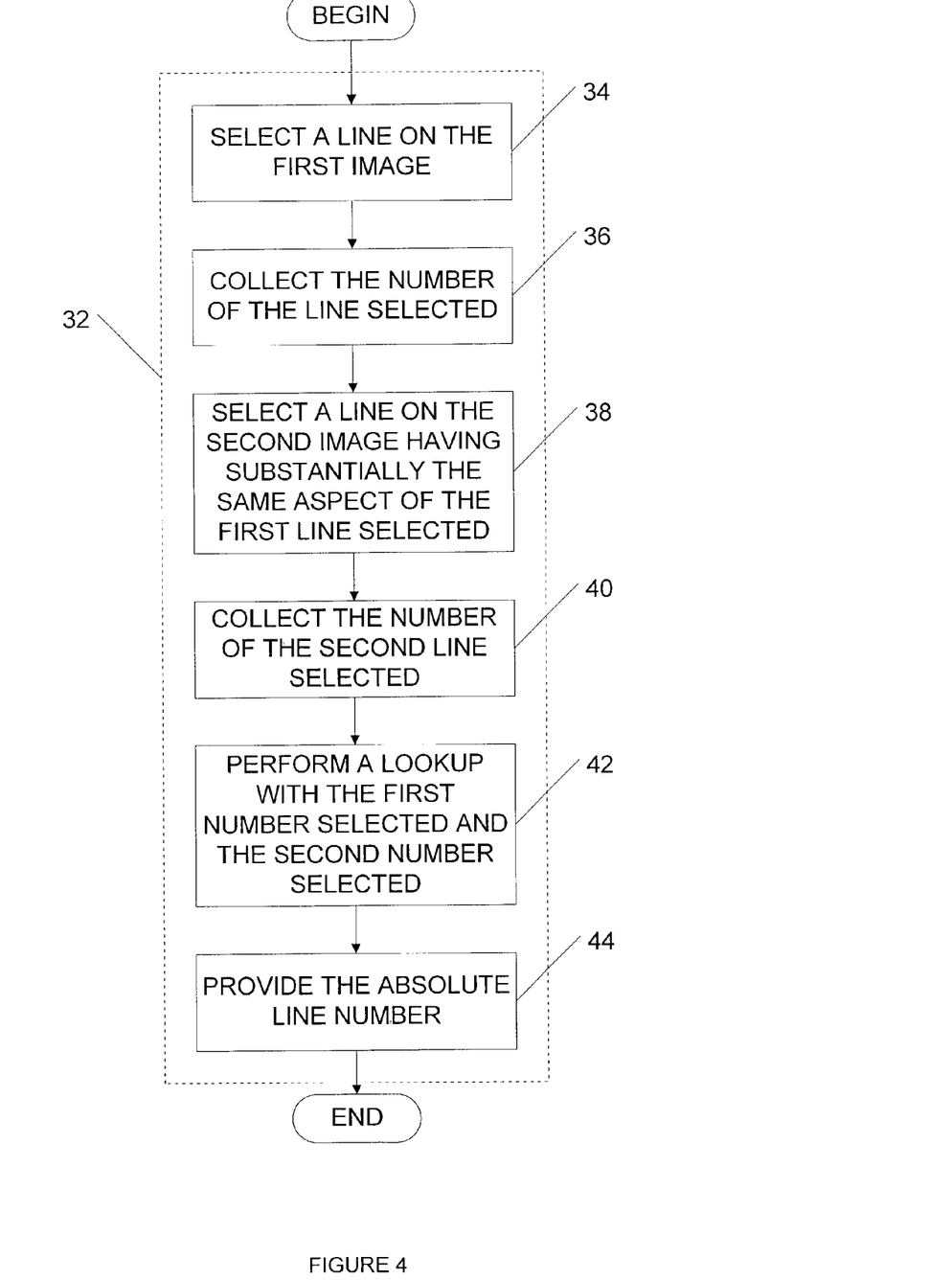
FIG. 4 is a flow chart which shows how the height of a profile is computed using the data shifted from two different video sources by two amounts of data.

Now referring to FIG. 4, there is shown how the original image is computed in the preferred embodiment of the invention.

According to step 34 of FIG. 4, a first profile is selected on the first shifted image provided by the first video acquisition source 10.

Figure 6:
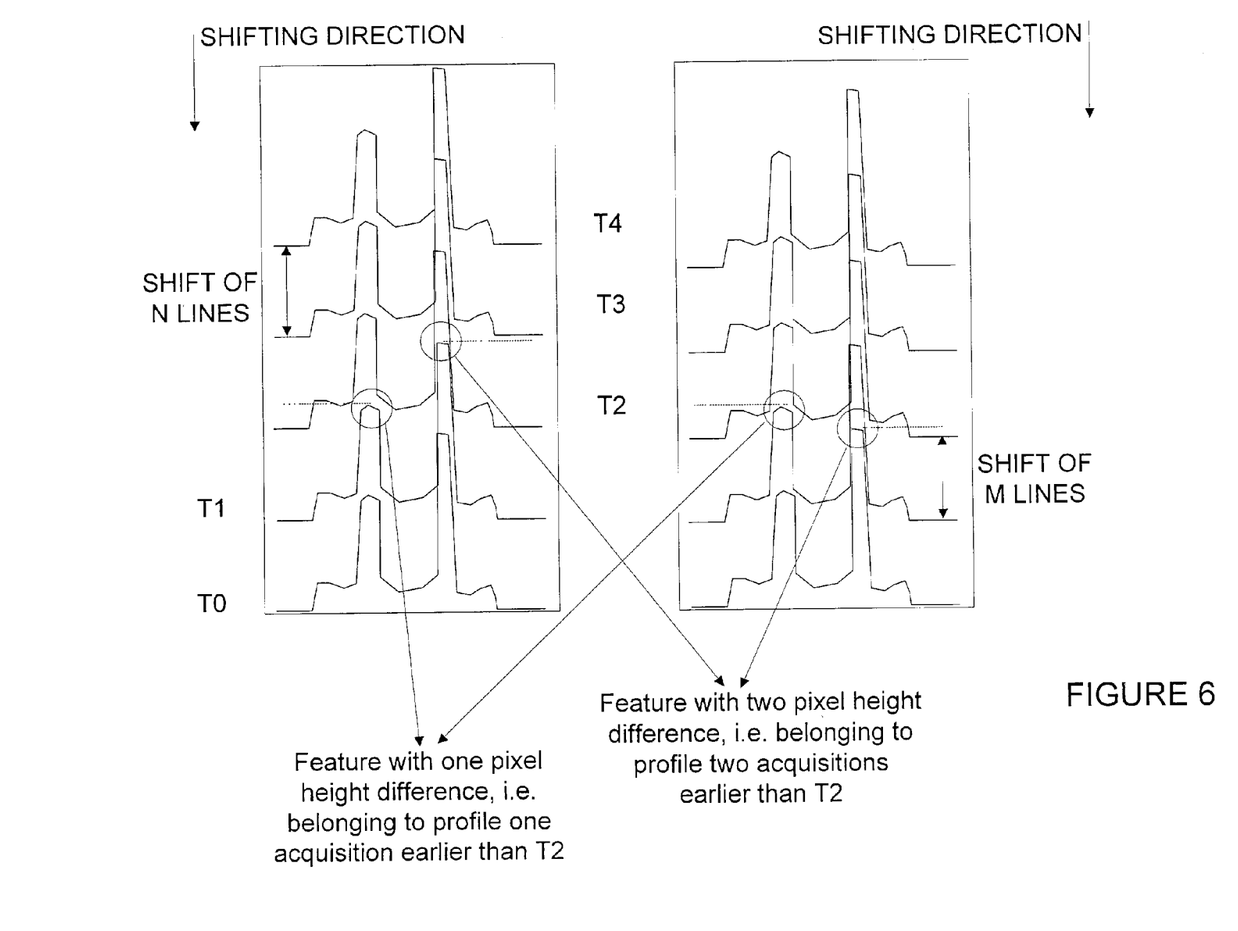
FIG. 6 shows two sets of consecutive profiles of spherical objects which are shifted from a predetermined amount of lines and used to reconstruct the original position according to the preferred embodiment of the invention.

Now referring to FIG. 6, there is shown two sets of consecutive acquired profiles.

The first set of the two sets of consecutive acquired profiles is shifted by n lines and corresponds to the data provided by the first video acquisition source 10, while the second set of the two sets of consecutive acquired profiles is shifted by m lines and corresponds to the data provided by the second video acquisition source 11.

It will be appreciated by someone skilled in the art, that each line of the CCD-based sensors may therefore be identified by a number between 0 and n for the first set of consecutive acquired profiles, while each line of the CCD-based sensors of the second video acquisition source 11 may be identified by a number located between 0 and m for the second set of consecutive acquired profiles.

As shown in FIG. 6, a profile line image of an object not changing shape (for simplicity of understanding) is illustrated over five acquisitions. The profile has one feature that is taller than N or M lines, and another feature that is greater than 2*M but less than 2*N. As illustrated, the profile line features can be recognized and most are within a height of M or N lines. However, the two features that exceed this height overlap with profile line images from other acquisition times. When the lines change from acquisition to acquisition during normal object profiling, confusion may result.

The profile data may be analyzed with respect to a baseline of each acquisition. In this case, the profile line data is analyzed in windows that are N and M lines tall respectively. In FIG. 6, N is 15 and M is 14, and thus N-M is simply one line. For example, at T=T2, the height with respect to the T2 baseline of each image of the leftmost overlapping feature is (N-M) pixels taller in the M line shift camera image than in the N line shift camera image, as illustrated. This means that the leftmost overlapping feature belongs to the profile line image of T1, and in this way, the confusion caused by the overlap has been disambiguated by having the two images. Of course, the precise height of the feature can be more accurately determined because of the use of two cameras, namely by averaging the height values obtained by sub-pixel interpolation.

Likewise, as illustrated in FIG. 6, the height of the rightmost overlapping feature is 2*(N-M) pixels different. However, because the feature is at the top of the window in the N line shift camera image window, the corresponding height of the feature in the window in the M line shift camera image is at the bottom. Thus, rightmost overlapping feature originates from T0 for the M line shift camera, and the feature originates from T1 for the N line shift camera.

In the preferred embodiment, a look-up table is used to translate the two integer height values (ranging from 1 to N and 1 to M, respectively) into a single absolute height value. Alternatively, the height of features from the two cameras is determined by interpolation of pixel values to sub-pixel accuracy. The absolute height is then determined by matching the height difference to the closest integer value corresponding to a number of lines. This integer height difference is used to determine the absolute height, i.e. to which acquisition time the feature belongs, so that complete profile line data can be gathered.

If the rightmost overlapping feature illustrated in FIG. 6 were about 3.5 times N in height then the feature from time T0 would appear in both images separated by 3*(N-M) pixels in height from the base line of the profile line acquired at time T3. For the remaining non-overlapping features of the profiles lines, the height will be the same with respect to the base line of each acquisition.

Now referring back to FIG. 4 and according to step 36, the height values of the profile selected, according to step 34, are acquired. The height values are located between 0 and n as the data provided by the first video acquisition source 10 is shifted continuously by n lines and as explained previously.

According to step 38 of FIG. 4, a second profile is selected on the second shifted image provided by the second video acquisition source 11.

According step 40, the height values of the second profile selected, according to step 38, are acquired. The height values are located between 0 and m as the data provided by the second video acquisition source 11 is shifted continuously by m lines and as explained previously.

Still referring to FIG. 4 and according to step 42, a lookup is performed in the lookup table 17. The lookup is performed using the height values of the first and second profile selected. In response to the combination of height values provided to the lookup database, an absolute height value is provided.

Figure 7:
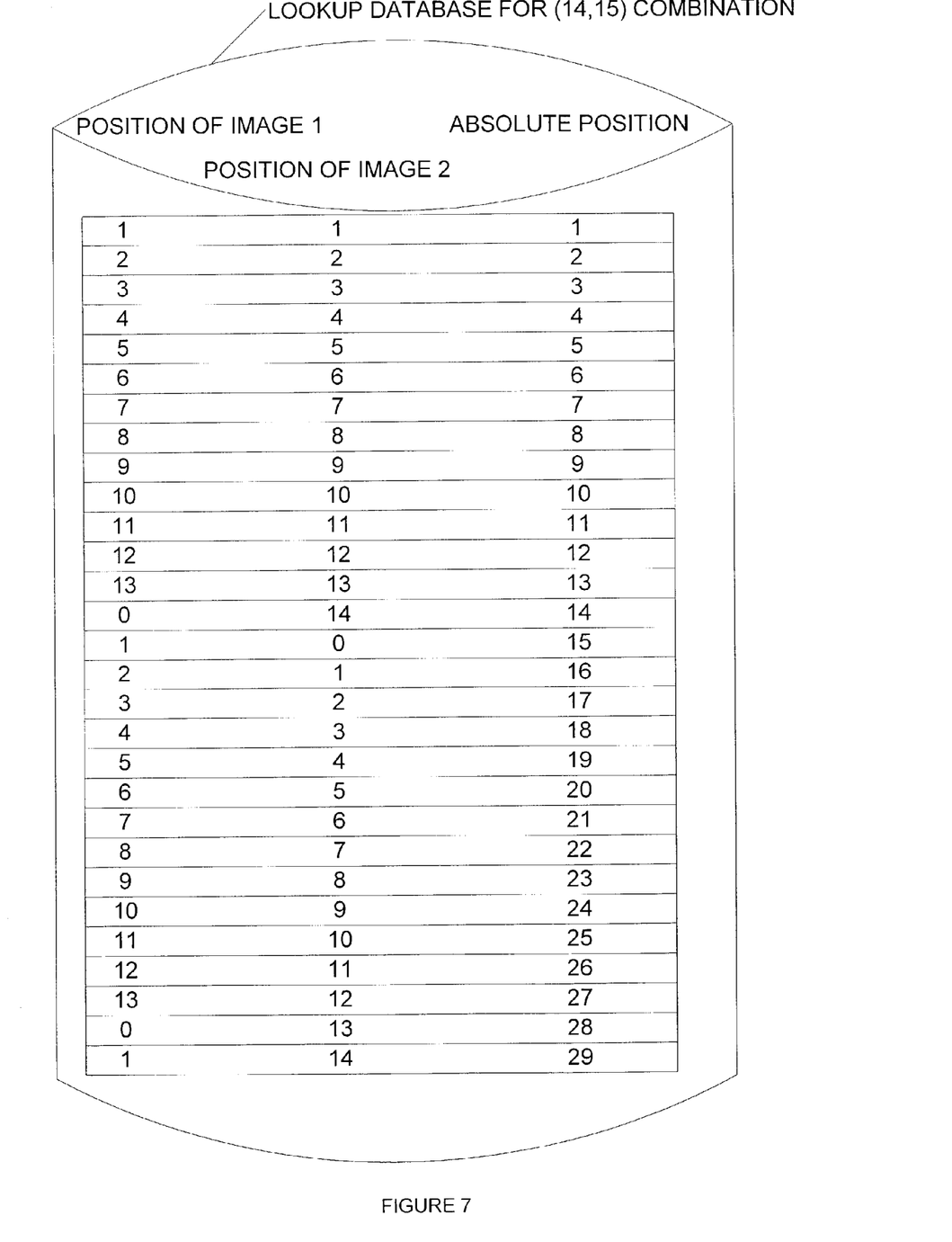
FIG. 7 shows an example of a lookup database which comprises a absolute position of an image for each combination of position from two images.

Now referring to FIG. 7, there is shown the lookup table for an n,m combination where n is equal to 14 and m is equal to 15. Each height value of a profile acquired by the first video acquisition source 10 may vary from 0 to 13 in this embodiment of the invention. Similarly, each height value of a profile acquired by the second video acquisition source 11 may vary from 0 to 14 in this embodiment of the invention.

As the greatest common denominator of 14 and 15 is one, the combination of an information acquired using the first video acquisition source 10, information ranging from 0 to 13, together in combination with the combination of an information acquired using the second video acquisition source 11, ranging from 0 to 14, define uniquely an information located between 0 and (14*15)−1=210−1=209.

Still referring to FIG. 7, for instance the combination of 5 and 4 defines uniquely the absolute value 19. In that particular case, a first element of a profile would have a height of 5 when acquired by the first video acquisition source 10, and a the corresponding element of the profile acquired by the second video acquisition source 11 would have a height of 4. An absolute height for the vertices would be easily determined using the invention.

Now referring back to FIG. 6, it will be appreciated by someone skilled in the art that profile recognition is therefore performed on a first data acquired by a first video acquisition source and shifted. The corresponding profile is located using the data acquired using the other video acquisition source. The absolute height for each profile is then computed using both profiles originating from each different video acquisition source.

Figure 5:
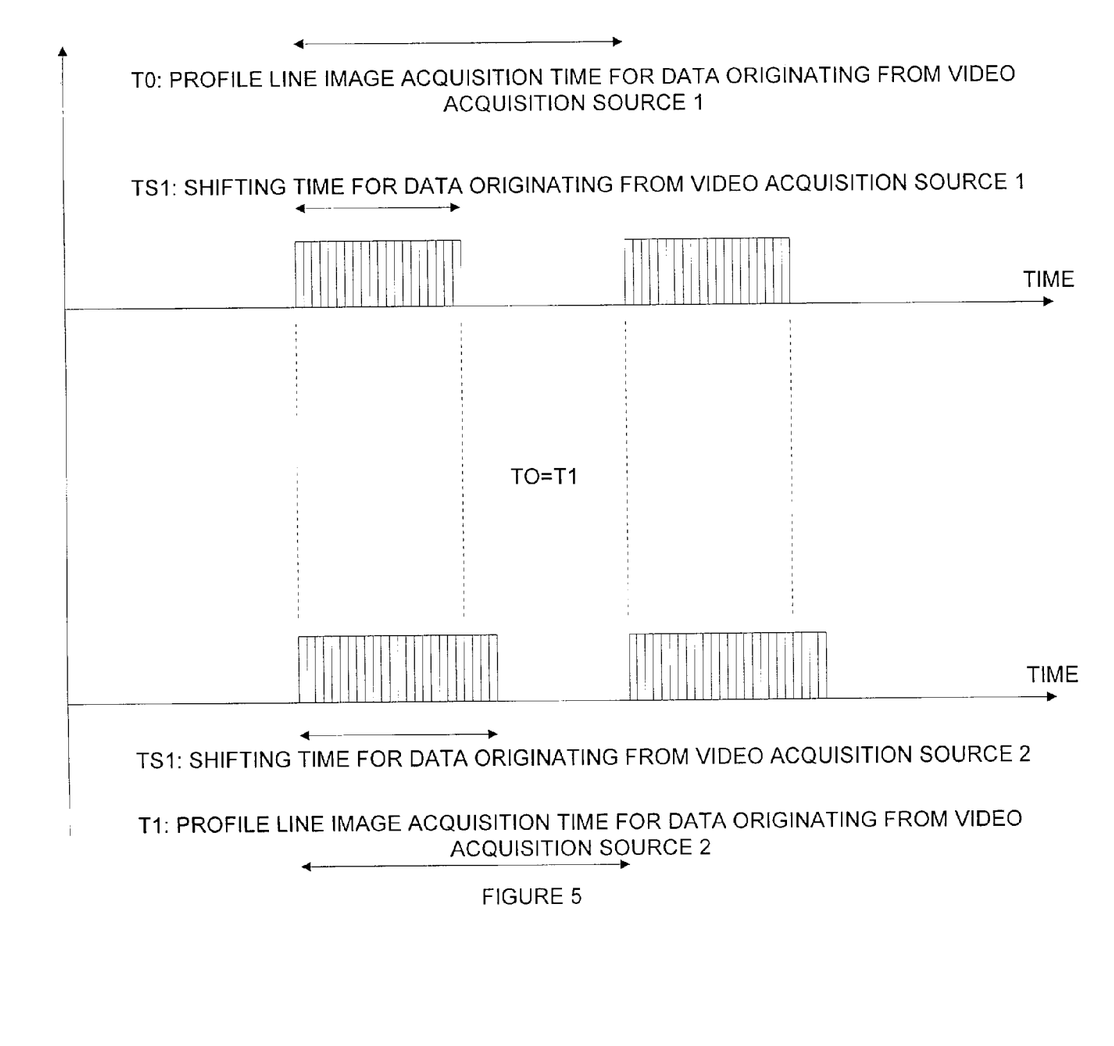
FIG. 5 shows the profile line acquisition time for data originating from the two video acquisition sources.

Now referring to FIG. 5, there is shown how the data originating from each of the video acquisition sources are shifted in one embodiment of the invention.

In one embodiment of the invention, each data corresponding to a profile acquired by a video acquisition source is acquired at the same time on both video acquisition sources. As each data originating from a single video acquisition source are shifted from a different number of lines depending on the video acquisition source related, the shifting time is different; however the total time to perform the acquisition time, the shifting time and the profile extraction is the same for both video acquisition sources in one embodiment of the invention and as shown in FIG. 5.

In the preferred embodiment of the invention, each data corresponding to a profile acquired by a video acquisition source is acquired at a different time on both video acquisition sources. However, and still in the preferred embodiment of the invention, the total time to perform the acquisition time, the shifting time and the profile extraction is the same for both video acquisition sources.

In the preferred embodiment of the invention the video acquisition source is a frame transfer CCD. In another embodiment of the invention an interline transfer CCD may be used as will note someone skilled in the art.

Figure 8:
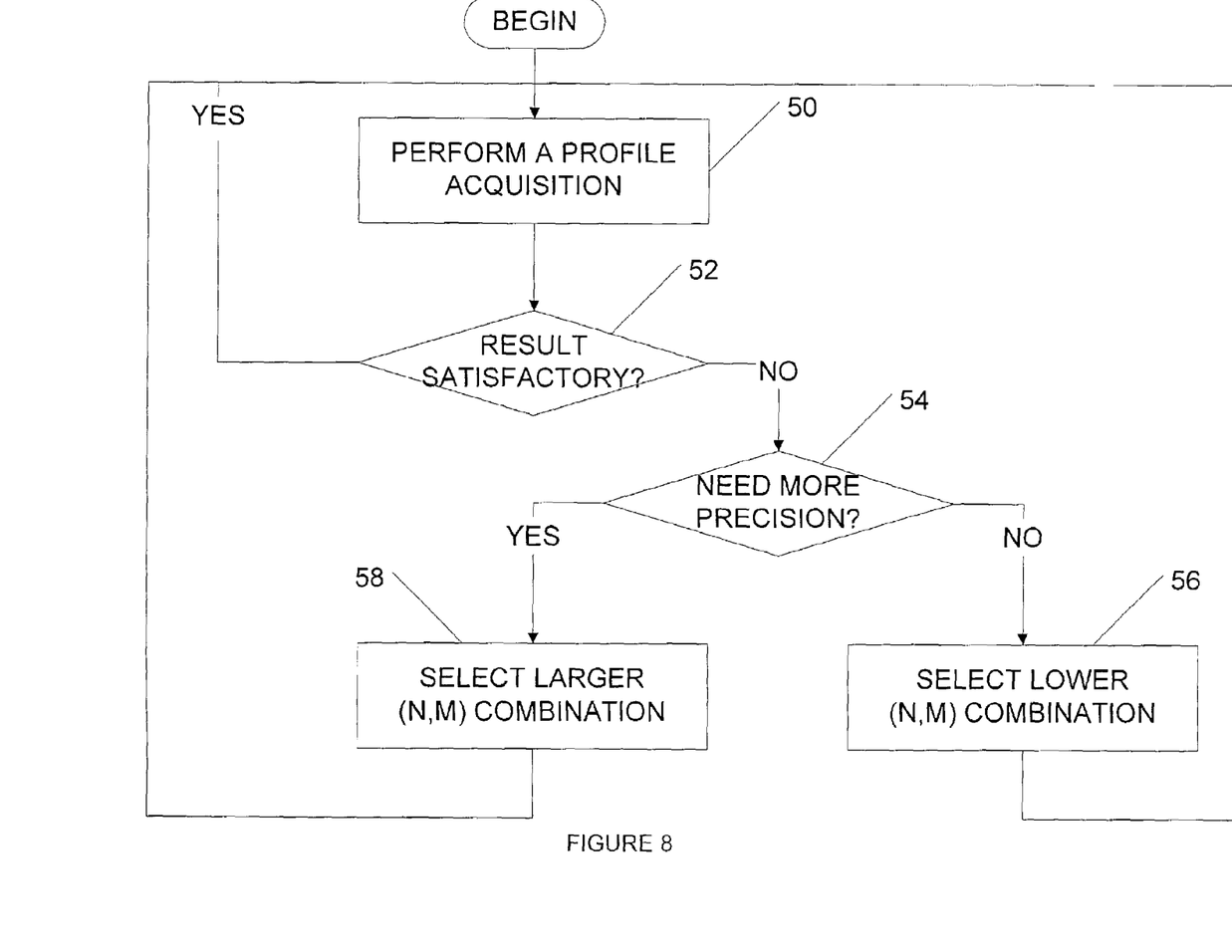
FIG. 8 is a flow chart which shows an embodiment in which a combination of integer for the shifting is changed according to the result obtained.

Now referring to FIG. 8, there is shown an alternative embodiment of the invention where the n,m integer combination may be changed.

According to step 50 of FIG. 8, a profile acquisition is performed using the profile selection units 12 and 13 over the video data provided by the video acquisition sources 10 and 11.

Still referring to FIG. 8 and according to step 52, a check is performed in order to see if the result obtained is good enough. The object to inspect might move horizontally at a high speed requiring therefore low integer in order to perform less acquisition before a shifting is performed. On the other hand, the object to inspect might move horizontally at a low speed requiring therefore a high integer in order to capture more data.

If the result obtained after the profile acquisition is not satisfactory, and according to step 54, a test is performed in order to check if more precision is needed. As explained previously, more precision may be needed if the object to inspect is moving slowly.

If more precision is needed and according to step 58, a larger integer combination n,m is selected by the combination selector 15 using the lookup table 17.

If less precision is needed and according to step 56, a lower integer combination n,m is selected by the combination selector 15 using the lookup table 17.

In the preferred embodiment the greatest common denominator of the new integer combination n,m is one.

In another alternative embodiment, a combination of more than two integer numbers may be used, with a greatest common denominator equal to one; each integer may be assigned to a unique video acquisition source. More than two video acquisition sources would therefore be used. The data from each of the more than two video acquisition sources would be shifted by a fixed number of lines defined by the respectively assigned integer number.

It will be appreciated, by someone skilled in the art, that for each couple of value for a height, an absolute value for the height is obtained.

In another alternative embodiment, the greatest common denominator of the combination of integers n,m may be different from 1. In such embodiment, the result using the lookup table 17, may provide more than one solutions for the absolute height. A choice must then be made for the absolute height using the more than one solution. The choice may be made using a statistical method or an iterative approach that will locate the range of the absolute value depending on previous measures for instance.

Figure 1B:
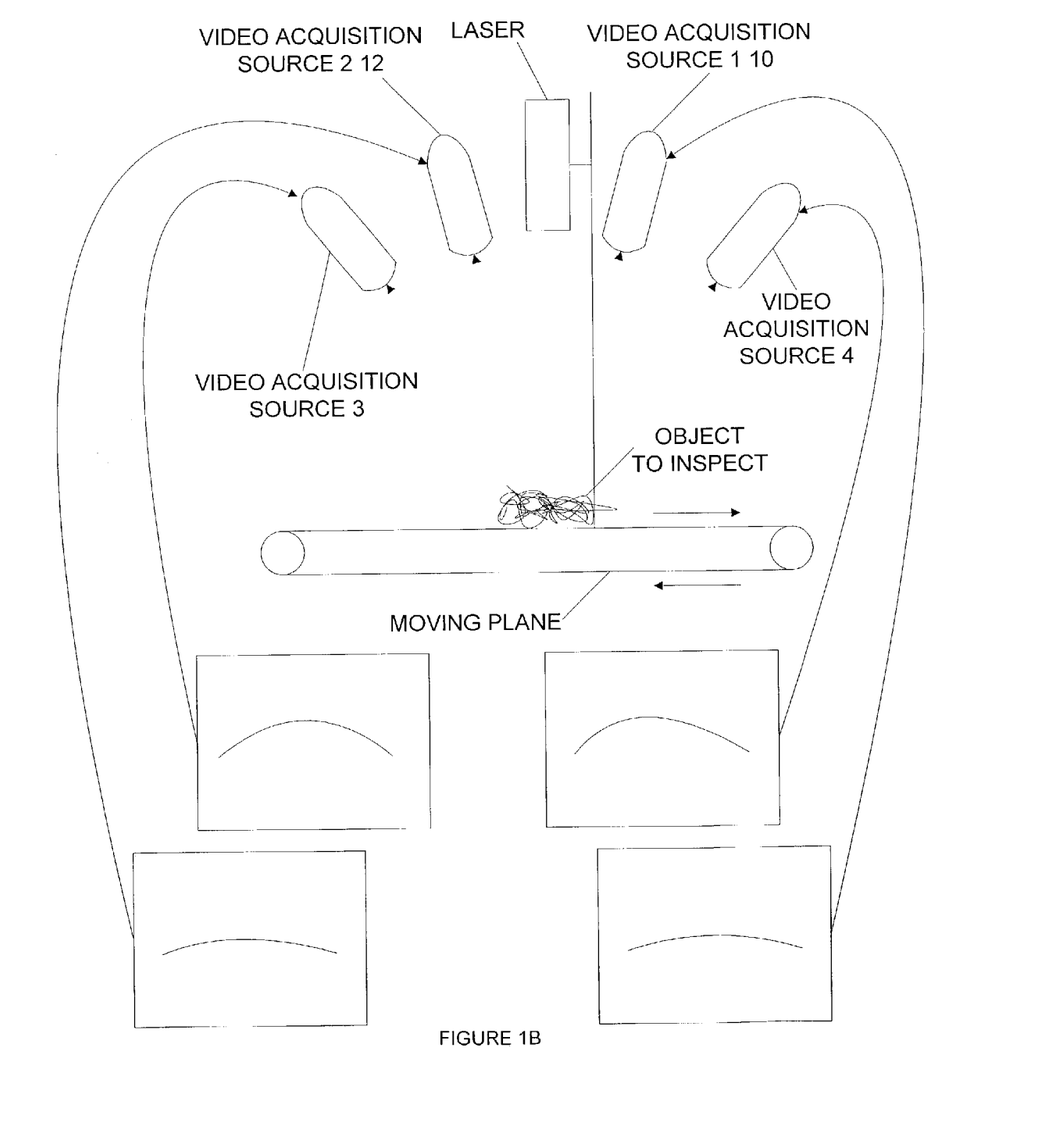
FIG. 1B shows a profile inspection apparatus comprising two video acquisition sources arranged on each side to provide different vertical magnification of the profile and a laser.

According to an alternative embodiment of the invention illustrated in FIG. 1B, the absolute height of the profile lines of the cameras arranged at about 50 degrees from the vertical plane of the inspection beam is discriminated with the help of images of the same profile lines obtained from cameras arranged at about 5 degrees from the vertical plane. In this case, the height of the profile lines on the 50 degree camera will be about 9 times greater than on the 5 degree camera. By controlling the two sets of cameras to acquire images with a spacing of about 0.12 of a full height of the camera vision, the profile line images can be acquired simultaneously on each side in accordance with the invention. The images from the 5 degree camera are essentially used to determine the general shape of the profile line to ensure easy extraction of the corresponding profile line from the images from the 50 degree camera where profile line overlap is to be expected with objects having an abrupt change in height during a scan. Thus profile line image data from the two image acquisition devices, namely the 5 degree and the 50 degree cameras, are compared to disambiguate the neighboring profile line images in the 50 degree camera and output individual profile line data from the neighboring profile line images.

As an alternative to using cameras at different angles, a cylindrical lens may be used to acquire images from the same angle while compressing the images in the vertical direction. It will be appreciated that the preferred embodiment involving CCD cameras operating at two different shift values yields disambiguation information while maintaining full resolution with each camera, and is preferred for this reason.

The embodiment(s) of the invention described above is(are) intended to be exemplary only. The scope of the invention is therefore intended to be limited solely by the scope of the appended claims.

I claim:

1. A method for imaging a profile line projected on an object, the method comprising the steps of:

providing at least two image acquisition devices each able to capture images of said profile line, at least one of said image acquisition devices comprising a charge-coupled device (CCD) sensor having N lines and capturing images of said profile line against an essentially dark background with a plurality of neighboring profile line images captured within said N lines;

acquiring a series of images of said profile line using each of said image acquisition devices, wherein said series of images have different spatial characteristics from one another, and said neighboring profile line images overlap in a CCD sensor shift dimension; and comparing profile line image data from said at least two image acquisition devices to disambiguate said neighboring profile line images and output individual profile line data from at least said neighboring profile line images.

2. The method as defined in claim 1, wherein said image acquisition devices acquire substantially identical profile line images having a same scale, said different spatial characteristic being a spacing between said neighboring profile line images.

3. The method as defined in claim 2, wherein one of said image acquisition devices captures one image of said profile line within N lines, said image acquisition devices operating at different image acquisition rates, said comparing comprising using said one image most closely associated in time with each of said neighboring profile line images to disambiguate said neighboring profile line images and output said individual profile line data.

4. The method as defined in claim 2, wherein said image acquisition devices operate at a same image acquisition rate, said spacing being n lines for a first one of said image acquisition devices and m lines for a second one of said image acquisition devices.

5. The method as defined in claim 4, wherein said profile line is projected on said object from a light source projecting light in a vertical plane, said image acquisition cameras are arranged on opposite sides of said vertical plane at equal angles.

6. The method as defined in claim 5, wherein a greatest common denominator (GCD) of n and m is one.

7. The method as defined in claim 4, wherein a greatest common denominator (GCD) of n and m is one.

8. The method as defined in claim 4, wherein said image acquisition devices acquire images at different times, wherein a progression of said profile line over time is observed at essentially twice said image acquisition rate.

9. The method as defined in claim 6, wherein said comparing comprises determining a height value of each feature located at a common position in a direction transverse to said CCD sensor shift dimension within said profile line with respect to a base from each of said images from said image acquisition devices, and determining an absolute height value for said feature from a pair of said height values, said feature being determined within a window of height n and m respectively for said image acquisition devices.

10. The method as defined in claim 9, wherein said determining said absolute height value comprises using a look-up table.

11. The method as defined in claim 9, wherein said feature comprises a pixel.

12. The method as defined in claim 1, wherein one of said image acquisition devices acquires profile line images having a different scale from said neighboring profile line images, said image acquisition devices being arranged to acquire substantially identical profile line images apart from said different scale.

13. The method as defined in claim 12, wherein said image acquisition devices operate at a same image acquisition rate.

14. The method as defined in claim 12, wherein said different scale compresses profile line images in said CCD sensor shift dimension and is the same in a transverse direction with respect to said neighboring profile line images.

15. The method as defined in claim 14, wherein said one of said image acquisition devices having a different scale is positioned at a different angle from said image acquisition device capturing said neighboring profile line images.

16. The method as defined in claim 15, wherein said compressed profile line images do not overlap in said CCD sensor shift dimension.

17. The method as defined in claim 16, wherein said image acquisition devices operate at a same image acquisition rate.

18. The method as defined in claim 14, wherein said one of said image acquisition devices having a different scale is provided with a cylindrical lens.

19. The method as defined in claim 18, wherein said image acquisition devices operate at a same image acquisition rate.

20. The method as defined in claim 19, wherein said compressed profile line images do not overlap in said CCD sensor shift dimension.

* * * * *